United States Patent
Schneider et al.

(10) Patent No.: US 6,955,766 B2
(45) Date of Patent: Oct. 18, 2005

(54) METHOD FOR REDUCING HARMFUL ORGANISMS IN CURRENTS OF WATER

(75) Inventors: Roland Schneider, Hasselroth (DE); Egon Walzer, Maintal (DE); Norbert Steiner, Alzenau (DE)

(73) Assignee: Degussa AG, Düsseldorf (DE)

( * ) Notice: Subject to any disclaimer, the term of this patent is extended or adjusted under 35 U.S.C. 154(b) by 46 days.

(21) Appl. No.: 10/963,094

(22) Filed: Oct. 12, 2004

(65) Prior Publication Data

US 2005/0072743 A1 Apr. 7, 2005

Related U.S. Application Data

(63) Continuation of application No. 10/110,545, filed on Jul. 8, 2002.

(30) Foreign Application Priority Data

Nov. 24, 1999 (DE) .......................................... 199 56 348

(51) Int. Cl.⁷ .................................................. C02F 1/50
(52) U.S. Cl. ......................... 210/759; 210/764; 422/28; 514/557
(58) Field of Search ................................ 210/758, 759, 210/764; 162/161; 422/28; 514/557

(56) References Cited

U.S. PATENT DOCUMENTS

| | | |
|---|---|---|
| 5,256,423 A | 10/1993 | Egusa et al. |
| 5,393,781 A | 2/1995 | Vegega et al. |
| 5,569,386 A | 10/1996 | Wolf |
| 5,980,758 A | 11/1999 | LaZonby et al. |
| 6,211,237 B1 | 4/2001 | Huss et al. |

OTHER PUBLICATIONS

Kramer, Jeffrey F., "Peracetic Acid: A New Biocide for Industrial Water Applications," Material Performance, Aug. 1997, pp. 42–50, vol. 36, Issue 8, FMC Corp., Princeton, NJ.

*Primary Examiner*—Peter A. Hruskoci
(74) *Attorney, Agent, or Firm*—Smith, Gambrell & Russell, LLP

(57) ABSTRACT

Method for reducing harmful organisms on surfaces in contact with continuously or periodically flowing currents of cooling water used for throughflow cooling without recirculation, wherein the harmful organisms are algae, mussels and slime forming organisms, by periodically adding an aqueous treatment agent containing at least one peroxycarboxylic acid with 1 to 6 C atoms to the flowing water once every 5 to 100 hours over a period of 3 to 60 minutes in an amount corresponding to at least 1 ppm of peroxycarboxylic acid to reduce growth of the organisms on the surfaces.

8 Claims, No Drawings

METHOD FOR REDUCING HARMFUL ORGANISMS IN CURRENTS OF WATER

REFERENCE TO A RELATED APPLICATION

This application is a continuation of application Ser. No. 10/110,545 filed Jul. 8, 2002, and claims the benefit of German priority application 199 56 348.9 filed Nov. 24, 1999, both of which are relied on and incorporated herein by reference.

DESCRIPTION

The present invention relates to a method for reducing harmful organisms such as algae, mussels and slime-forming organisms in continuously or periodically flowing water currents, in particular cooling water currents, comprising the addition of an aqueous treatment agent that contains at least one peroxycarboxylic acid with 1 to 6 C atoms. The invention relates in particular to the use of the treatment agent in an economic manner and to the reliable avoidance of operational malfunctions that may arise due to the growth of mussels in pipework and apparatus through which water flows.

Water is used as a coolant in industry and in power stations, in which the water flows through the corresponding cooling plant. The design, construction and scope of the cooling plant, the necessary cooling water treatment methods and the plant-related capabilities may vary very widely from case to case. Accordingly, an attempt is made using the available possibilities to maintain a cooling operation that is as economic and as trouble-free as possible.

Cooling systems are differentiated, inter alia, according to whether the cooling water is used only once in throughflow mode (throughflow cooling) or several times in recirculation mode (recirculation cooling), wherein in the latter case the heated water has to be recooled.

In the case of recirculation cooling the recooling may be performed in open recirculation coolers, in which the water to be cooled is brought into contact with air in countercurrent or cross current. Alternatively the recooling of the recirculation cooling water may take place in surface heat exchangers, in which throughflow cooling or open recirculation cooling may be carried out on the cooling side of the heat exchanger.

In the case of throughflow cooling particular care is necessary in the choice of the treatment agent since the types of water, such as groundwater, river water, lake water, sea water and brackish water differ very widely as regards composition.

The use of throughflow cooling often has the advantage that over the course of the year the water temperatures are lower than in the case of recirculation cooling and that savings can be made in plant costs for a cooling tower operation and a special water treatment. The water used for the throughflow cooling must however satisfy a number of essential preconditions, among which are a very low corrosiveness and a very low tendency to form mineral-based deposits (scaling), organic-based deposits (fouling) or deposits caused by growth of microorganisms (biofouling).

The biological growth in both open and closed cooling circulations leads to corrosion damage, decreased heat transfer and reduced efficiency of the heat exchangers. The sites at which microbiological growth can noticeably interfere and cause damage in a cooling system vary greatly. Often it is a specific class of microorganisms that leads to damage at particular sites in a cooling plant. Accordingly, in most cases the whole cooling water flow already has to be treated against harmful organisms at the inlet to the system. In addition to inorganic substances such as sand and slurry, which are separated by a filter, it is generally living or dead microorganisms such as mussels and nematodes (threadworms) as well as a very wide variety of other organic substances that are contained in the water used for cooling purposes.

Algae constitute a large group of microorganisms occurring in cooling water streams, which can grow on light-accessible sites in practically any open cooling circuit. Dense layers of algae on the material surfaces reduce the efficiency of cooling systems and often serve as a nutrient source for the bacteria, fungi, protozoa and worms that are found in most open cooling systems. Parts of the algal growth fall off, which can lead to blockages of pipes, screens and nozzles.

A large number of bacterial species form slime in cooling water systems, which leads to the rapid build-up and interference from layers or blockages and to the development of sulfate-reducing corrosive bacteria.

A further group of interfering harmful organisms are various species of mussels, which enter cooling systems already in the larval stage and can cause very serious interference in cooling circuits in large industrial plants and in power stations. Apart from blockages on heat exchanger surfaces, screens and nozzles, this mussel growth leads to constrictions in pipeline cross-sections and thus to an increase in pressure and energy losses. Furthermore, the pipelines have to be cleaned at regular intervals by hand, which is a complicated and expensive business, and results in operational downtime and cost-intensive measures. Since the so-called "mussel surge", i.e. the discharge of millions of microscopically small larvae, already takes place at water temperatures of around or below 80° C. and accelerates at higher temperatures, a treatment of the cooling water is necessary.

In large industrial operations chlorine, whose action is well known, is predominantly used as biocide. Since chlorine is extremely reactive it also reacts chemically with other constituents in the water, which is generally undesirable and leads to a significantly increased chlorine consumption. Furthermore, many slime-forming microorganisms and certain diatomaceous algae and green algae are relatively resistant to chlorine. Furthermore, the danger of corrosion also rises with an increase in the chlorine dosage.

Ozone and chlorine dioxide have of course been proposed for the treatment of cooling water currents, though the use of these agents is costly and technically complicated.

Effective agents for treating static and flowing water in order to control microorganisms such as slime-forming bacteria and algae as well as higher harmful organisms such as nematodes and mussels include hydrogen peroxide and aqueous solutions containing an organic low molecular weight peroxycarboxylic acid (Degaclean® product information from Degussa-Hüls AG (10/99)).

U.S. Pat. No. 5,393,781 discloses a method for controlling zebra mussels in aqueous systems such as water treatment plants in industry and power stations. In this case the water is treated with a biocidally active amount of peroxyacetic acid. The amount used is at least 0.1 ppm, though generally a concentration of 10 mg/l and above is necessary in order to achieve an acceptable mortality rate of the mussels in a sufficiently short time. As treatment agent there is used an at least 1 wt. % peroxyacetic acid solution, conveniently a so-called equilibrium peracetic acid, which besides peroxyacetic acid also contains hydrogen peroxide and acetic acid.

Although a continuous dosage of the flowing water with the treatment agent is efficient, it leads to a high consumption and thus high costs. The US document relates to the batchwise treatment of water, but gives no indication as to how continuously or at least periodically flowing water currents such as cooling water currents are to be economically treated.

The object of the present invention is accordingly to provide a method whereby the treatment of water currents such as cooling water currents containing mussels and/or mussel larvae can be effected in a more economic manner in throughflow plants.

A method for reducing harmful organisms such as algae, mussels and slime-forming organisms in continuously or periodically flowing water currents, in particular cooling water currents, has been found, said method comprises the addition of an aqueous treatment agent containing at least one peroxycarboxylic acid with 1 to 6 C atoms, which method is characterised in that the treatment agent is added to the flowing water once every 5 to 100 hours over a period of 3 to 60 minutes in an amount corresponding to at least 1 ppm of peroxycarboxylic acid.

The subclaims are directed to preferred embodiments.

The treatment agent is preferably an aqueous solution that contains, apart from at least one peroxycarboxylic acid, also the precursor carboxylic acid and hydrogen peroxide. Preferably the components are present in equilibrium, thereby forming so-called equilibrium peroxycarboxylic acids.

The agents preferably contain one or more peroxycarboxylic acids from the group comprising peroxyformic acid, peroxyacetic acid, peroxypropionic acid, monoperoxysuccinic or diperoxysuccinic acid, peroxyglutaric acid and peroxyadipic acid. In addition the agents may also contain longer-chain peroxycarboxylic acids since these are known to produce synergistic interactions.

Particularly preferably the agent contains peroxyacetic acid and/or peroxyformic acid. Agents containing peroxyformic acid can readily be obtained by adding formic acid to a commercially available peroxyacetic acid or to an aqueous hydrogen peroxide solution.

The amount of peroxycarboxylic acid(s) in the agent to be used is generally in the range from 1 to 35 wt. %, in particular in the range from 5 to 15 wt. %.

At least 1 ppm, preferably 2 to 5 ppm and in particular 5 to 20 ppm of peroxycarboxylic acid are periodically added to the flowing water to be treated.

The good antimicrobial action of the agent containing the peroxycarboxylic acid is due to its diffusibility through the cell membrane. As a result of the high oxidation potential of the peroxycarboxylic acid, there is an irreversible disruption of the enzyme system of the microorganism, resulting in the death of the latter. The contact with mussel larvae and mussels in the early developmental stage damages the overall organism, preventing further growth of the mussel.

The duration of the addition of the agent and the administration intervals are governed according to the temperature of the water and the type of harmful organisms. At a water temperature of around or below 8° C. a twice-weekly treatment for example lasting 5 to 60 minutes, in particular 15 to 30 minutes, is convenient.

During summer months when the water temperature is around or above 12° C., a daily treatment for 3 to 60 minutes, in particular 5 to 30 minutes, is recommended.

These dosage intervals ensure that the mussel organism, which is still sensitive to microbiocidal agents within the first 24 hours after the mussel "surge", is attacked by the product before the formation of the protective shell. Three days after the appearance of the larvae the shell formation has already progressed to such an extent that the mussels can protect themselves against harmful substances present in the water. Addition of microbiocidal agents at this developmental stage has proved to be almost useless. The addition of microbiocidal agents during the winter, beside having a prophylactic effect, is designed to suppress even the slightest growth in the immediate vicinity. According to the invention the nature of the addition of the agent, namely a periodic addition, besides being highly effective is also the most economical.

It could not be foreseen that a periodic addition would be sufficient to protect water treatment plants effectively against the incidence of harmful organisms and the subsequent operational malfunctions.

The following example illustrates the invention.

EXAMPLE

An operational experiment was carried out in an industrial chemical plant, in which cooling water was treated over a period of 6 weeks in two sets of experimental apparatus (mussel and algae monitors). The cooling water was a mixture of river and lake water. The cooling water, which was kept at a constant temperature in the experimental unit, first of all flowed through a fine filter to prevent mussels already a few days old entering the system. Algae constituents were at the same time also filtered out. The water then flowed through a pipeline provided with a thin-mesh trap box as well as various perforated metal plates. Mussels as well as algae can accumulate on these built-in structures and therefore enjoy optimum growth conditions due to a uniform temperature, flow velocity, darkness and provision of nutrients.

The cooling water flowing through the experimental apparatus was treated with equilibrium peracetic acid containing 15 wt. % of peroxyacetic acid in order to reduce harmful organisms. The amount of equilibrium peracetic acid that was added was in each case 40 ppm, i.e. 6 ppm of peroxyacetic acid. The acid was added once a day at the same time over a period of 15 minutes. During the addition duration according to the invention (26 days) no harmful organisms collected in the algae and mussel monitors.

The fouling factor, which is an indicator of the growth of slime and algae, was also measured. With the addition over 26 days according to the invention the anti-fouling factor was in the range from 0 to less than 5%. After the addition on day 26 the addition was extended to 34 days, the anti-fouling factor then rising to 50%. After renewed daily addition according to the invention the anti-fouling factor fell again and reached 0% on day 42.

What is claimed is:

1. Method for reducing harmful organisms on surfaces in contact with continuously or periodically flowing currents of cooling water used for throughflow cooling without recirculation, wherein said harmful organisms are algae, mussels before formation of a protective shell and slime forming organisms, comprising periodically adding an aqueous treatment agent containing at least one peroxycarboxylic acid with 1 to 6 C atoms to the flowing water once every 5 to 100 hours over a period of 3 to 60 minutes in an amount corresponding to at least 1 ppm of peroxycarboxylic acid to reduce growth of said organisms on said surfaces.

2. Method according to claim 1, wherein the treatment agent contains a peroxycarboxylic acid selected from the group consisting of peroxyformic acid, peroxyacetic acid, peroxypropionic acid, monoperoxysuccinic acid, diperoxysuccinic acid, peroxyglutaric acid and peroxyadipic acid.

3. Method according to claim 2, wherein an aqueous solution containing hydrogen peroxide and at least one of peroxyacetic acid and peroxyfonnic acid is used as the treatment agent.

4. Method according to claim 3, wherein an equilibrium peroxyacetic acid containing 5 to 15 wt. % of peroxyacetic acid is used.

5. Method according to claim 1, wherein the treatment agent is added to the flowing currents of water once a day over a period of 5 to 30 minutes.

6. Method according claim 1, wherein from 2 to 5 ppm of peroxycarboxylic acid is used.

7. Method according to claim 1, wherein from 5 to 20 ppm of peroxycarboxylic acid is used.

8. Method for reducing harmful organisms on surfaces in contact with continuously or periodically flowing currents of cooling water, wherein said harmful organisms are algae, mussels before formation of a protective shell and slime forming organisms, comprising periodically introducing into a throughflow cooling system without recirculation, an aqueous treatment agent containing at least one peroxycarboxylic acid with 1 to 6 C atoms to the flowing water once every 5 to 100 hours over a period of 3 to 60 minutes in an amount corresponding to at least 1 ppm peroxycarboxylic acid to reduce growth of said organisms on said surfaces.

* * * * *